US009524816B2

(12) United States Patent
Katter et al.

(10) Patent No.: US 9,524,816 B2
(45) Date of Patent: *Dec. 20, 2016

(54) METHOD OF FABRICATING A WORKING COMPONENT FOR MAGNETIC HEAT EXCHANGE

(75) Inventors: Matthias Katter, Alzenau (DE); Volker Zellmann, Linsengericht (DE); Alexander Barcza, Hanau (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 1152 days.

This patent is subject to a terminal disclaimer.

(21) Appl. No.: 13/026,150

(22) Filed: Feb. 11, 2011

(65) Prior Publication Data
US 2012/0045633 A1  Feb. 23, 2012

(30) Foreign Application Priority Data

Aug. 18, 2010  (GB) .................................. 1013784.2

(51) Int. Cl.
H01F 1/01     (2006.01)
B23P 15/26    (2006.01)

(52) U.S. Cl.
CPC .............. H01F 1/017 (2013.01); B23P 15/26 (2013.01); H01F 1/015 (2013.01); Y10T 29/4935 (2015.01); Y10T 428/24992 (2015.01)

(58) Field of Classification Search
CPC .......... H01F 1/017; H01F 1/015; H01F 1/012; H01F 35/32; H01F 35/12–35/26; H01F 35/34; B23P 15/26; F02G 1/057; F28D 19/00–19/048; Y02B 30/66; B22F 7/008; B22F 1/0003; Y10T 29/4935
USPC ........... 29/890.03, 890.034; 62/3.1, 3.2, 3.7; 136/203; 419/6, 29, 32, 34; 428/218, 446; 264/603, 646, 653

See application file for complete search history.

(56) References Cited

U.S. PATENT DOCUMENTS

| | | | |
|---|---|---|---|
| 428,057 A | 5/1890 | Tesla | |
| 3,841,107 A | 10/1974 | Clark | |
| 4,112,699 A | 9/1978 | Hudson, III et al. | |
| 4,322,257 A | 3/1982 | Menth et al. | |
| 4,332,135 A | 6/1982 | Barclay et al. | |
| 4,849,017 A | 7/1989 | Sahashi et al. | |
| 5,387,272 A * | 2/1995 | Kamitsuma et al. | ............ 75/230 |
| 5,545,597 A * | 8/1996 | Yeckley | ....................... 501/97.2 |
| 5,930,582 A * | 7/1999 | Ito et al. | ......................... 419/32 |
| 6,446,441 B1 | 9/2002 | Dean | |
| 6,588,215 B1 | 7/2003 | Ghoshal | |
| 6,676,772 B2 | 1/2004 | Saito et al. | |
| 6,826,915 B2 | 12/2004 | Wada et al. | |
| 7,063,754 B2 | 6/2006 | Fukamichi et al. | |
| 7,076,959 B2 | 7/2006 | Lewis | |
| 7,168,255 B2 | 1/2007 | Saito et al. | |
| 7,186,303 B2 | 3/2007 | Kogure et al. | |
| 7,347,968 B2 * | 3/2008 | Lim et al. | .......................... 419/6 |
| 7,563,330 B2 * | 7/2009 | Tsuji | ....................... H01F 1/015 |
| | | | 148/101 |
| 7,670,443 B2 | 3/2010 | Kogure et al. | |
| 7,695,574 B2 | 4/2010 | Nakajima | |
| 7,914,628 B2 | 3/2011 | Tsuji et al. | |
| 8,037,692 B2 | 10/2011 | Muller et al. | |
| 8,551,210 B2 * | 10/2013 | Reppel | .................... F25B 21/00 |
| | | | 148/301 |
| 9,175,885 B2 * | 11/2015 | Katter | ..................... F25B 21/00 |
| 2004/0079446 A1 | 4/2004 | Kogure et al. | |
| 2004/0093877 A1 | 5/2004 | Wada et al. | |
| 2004/0182086 A1 | 9/2004 | Chiang et al. | |
| 2004/0194855 A1 | 10/2004 | Fukamichi et al. | |
| 2004/0261420 A1 | 12/2004 | Lewis | |
| 2005/0172643 A1 | 8/2005 | Lewis | |
| 2006/0005898 A1 | 1/2006 | Liu et al. | |
| 2006/0076084 A1 | 4/2006 | Nakajima | |
| 2006/0213580 A1 | 9/2006 | Tsuji et al. | |

(Continued)

FOREIGN PATENT DOCUMENTS

DE     103 38 467 A1    3/2004
DE     10330574         6/2004

(Continued)

OTHER PUBLICATIONS

Fujieda, S. et al., "Strong Magnetocaloric Effects in $La_{1-z}Ce_z(Fe_{x-y}Mn_ySi_{1-x})_{13}$ at Low Temperatures," J. Appl. Phys. 89, 062504 (2006) American Institute of Physics (3 pages).

Fujieda, S. et al., "Enhancement of Magnetocaloric Effects in $La_{1-z}Pr_z(Fe_{0.88}Si_{0.12})_{13}$ and their Hydrides," J. Appl. Phys. 102, 023907 (2007) American Institute of Physics (5 pages).

Combined Search and Examination Report dated Mar. 22, 2011 for Great Britain Application No. 1013784.2.

(Continued)

*Primary Examiner* — Sarang Afzali

(74) *Attorney, Agent, or Firm* — Dickinson Wright PLLC

(57) ABSTRACT

A process of fabricating a monolithic working component for magnetic heat exchange is disclosed. The process includes mixing two or more portions comprising amounts of La, Fe, Si and at least one of T and R suitable to produce a $La_{1-a}R_a(Fe_{1-x-y}T_ySi_x)_{13}H_z$ phase, wherein T is at least one element from the group consisting of Mn, Co, Ni and Cr and R is at least one element from the group consisting of Ce, Nd, Y and Pr. The amount of T, R, and Si is selected for each of the two or more portions to provide the two or more portions with differing Curie temperatures and, preferably, a density, d, within a range of ±5% of an average density, $d_{av}$, of a total number of portions. The process includes heat treating a single monolithic green body formed from two or more precursor powder mixtures to produce a single monolithic working component.

25 Claims, 3 Drawing Sheets

(56) References Cited

U.S. PATENT DOCUMENTS

| | | |
|---|---|---|
| 2006/0218936 A1 | 10/2006 | Kobayashi et al. |
| 2006/0231163 A1 | 10/2006 | Hirosawa et al. |
| 2007/0137732 A1 | 6/2007 | Kogure et al. |
| 2007/0218319 A1 | 9/2007 | Ohkoshi et al. |
| 2007/0220901 A1 | 9/2007 | Kobayashi et al. |
| 2008/0078184 A1 | 4/2008 | Saito et al. |
| 2008/0078476 A1 | 4/2008 | Saito et al. |
| 2009/0194202 A1* | 8/2009 | Tanigawa ................. 148/217 |
| 2010/0037625 A1 | 2/2010 | Katter |
| 2010/0047527 A1 | 2/2010 | Katter |
| 2010/0116471 A1 | 5/2010 | Reppel et al. |
| 2010/0129794 A1 | 5/2010 | Fabis et al. |
| 2011/0048690 A1 | 3/2011 | Reppel et al. |
| 2011/0140031 A1 | 6/2011 | Katter et al. |
| 2011/0151230 A1 | 6/2011 | Katter |
| 2011/0168363 A9 | 7/2011 | Reppel et al. |
| 2011/0198069 A1 | 8/2011 | Katter et al. |

FOREIGN PATENT DOCUMENTS

| | | |
|---|---|---|
| DE | 10 2006 015 370 A1 | 10/2006 |
| DE | 112007003401 | 1/2010 |
| EP | 0 187 538 A2 | 7/1986 |
| EP | 0 217 347 B1 | 2/1993 |
| EP | 1 867 744 A1 | 12/2007 |
| EP | 1 463 068 B1 | 2/2009 |
| GB | 1076036 | 7/1967 |
| GB | 2 424 901 A | 10/2006 |
| GB | 2 458 039 A | 9/2009 |
| GB | 2458039 B | 9/2009 |
| GB | 2 459 066 A | 10/2009 |
| GB | 2459066 B | 10/2009 |
| GB | 2 460 774 A | 12/2009 |
| GB | 2460774 B | 12/2009 |
| JP | 60204852 A | 10/1985 |
| JP | 62243377 A | 10/1987 |
| JP | 63-055906 | 3/1988 |
| JP | 02-190402 | 7/1990 |
| JP | 4-338604 A | 11/1992 |
| JP | 4-338605 A | 11/1992 |
| JP | 7-320918 A | 12/1995 |
| JP | 2000-54086 | 2/2000 |
| JP | 3082195 | 8/2000 |
| JP | 3082195 B1 | 8/2000 |
| JP | 2000-274976 A | 10/2000 |
| JP | 2002-69596 | 3/2002 |
| JP | 2002-356748 A | 12/2002 |
| JP | 2003-28532 | 1/2003 |
| JP | 2003-28532 A | 1/2003 |
| JP | 2005-036302 A | 2/2005 |
| JP | 2005-93729 | 4/2005 |
| JP | 2005-113209 | 4/2005 |
| JP | 2005-120391 A | 5/2005 |
| JP | 2005-226125 | 8/2005 |
| JP | 2006-89839 A | 4/2006 |
| JP | 2006124683 A | 5/2006 |
| JP | 2006-283074 A | 10/2006 |
| JP | 2007-031831 A | 2/2007 |
| JP | 2007-084897 A | 4/2007 |
| JP | 2007-281410 A | 10/2007 |
| JP | 2007291437 A | 11/2007 |
| JP | 2005-226125 | 8/2008 |
| JP | 2009-249702 A | 10/2009 |
| WO | WO 93/25857 | 12/1993 |
| WO | WO 00/45397 A1 | 8/2000 |
| WO | WO 2004/019379 A2 | 3/2004 |
| WO | WO 2005/066980 A2 | 7/2005 |
| WO | WO 2006/074790 A1 | 7/2006 |
| WO | WO 2007/026062 A1 | 3/2007 |
| WO | WO 2007/065933 A1 | 6/2007 |
| WO | WO 2008/099234 A9 | 8/2008 |
| WO | WO 2008/099235 A1 | 8/2008 |
| WO | WO 2009/090442 A1 | 7/2009 |
| WO | WO 2010/038096 A1 | 4/2010 |
| WO | WO 2010/038098 A1 | 4/2010 |
| WO | WO 2010/128357 A1 | 11/2010 |

OTHER PUBLICATIONS

Richard, M.A. et al., "Magnetic Refrigeration: Single and Multimaterial active Magnetic Regenerator Experiments," Journal of Applied Physics, vol. 95, No. 4, Feb. 15, 2004, pp. 2146-2150, American Institute of Physics (6 pages).

Barrett, C.S., "Crystal Structure of Metals," ASM Handbook, Formerly Ninth Edition, Metals Handbook, vol. 9, ASM International, Materials Park, OH (1985), pp. 8-9.

Bulanova, M. V. et al., "Lanthanum-silicon System," Journal of Alloys and Compounds 329 (2001) (pp. 214-223).

Chang, H. et al., "Theoretical Study of Phase Forming of $NaZn_{13}$-type Rare-Earth Intermetallics," J. Phys.: Condens. Matter, vol. 15 (2003) pp. 109-120 XP002385787.

Fujieda, S. et al., "Giant Isotropic Magnetostriction of Itinerant-Electron Metamagnetic $La(Fe_{0.88}Si_{0.12})_{13}H_{-\gamma}$ Compounds," Applied Physics Letters, vol. 79, No. 5, Jul. 30, 2001, pp. 653-655.

Fujieda, S. et al., "Large Magnetocaloric Effect in $La(Fe_xSi_{1-x})_{13}$ Itinerant-Electron Metamagnetic Compounds," Applied Physics Letters, vol. 81, No. 7, Aug. 12, 2002, American Institute of Physics (2002) pp. 1276-1278.

Fujita, A. at al., "Control of Large Magnetocaloric Effects in Metamagnetic $La(Fe_xSi_{1-x})_{13}$ Compounds by Hydrogenation," Journal of Alloys and Compounds 404-406 (2005) pp. 554-558, Elsevier B.V. (5 pages).

Fujita, A. et al., "Giant Magnetovolume and Magentocaloric Effects in Itinerant-Electron Metamagnetic $La(Fe_xSi_{1-x})_{13}$ Compounds," Materia Japan, vol. 41, No. 4, Apr. 20, 2002, pp. 269-275.

Fujita, A. et al., "Giant Volume Magnetostriction Due to the Itinerant Electron Metamagnetic Transition in $La(Fe-Si)_{13}$ Compounds," Department of Materials Science, Graduate School of Engineering, IEEE Transactions on Magnetics, vol. 35, No. 5, Sep. 1999 (pp. 3796-3798).

Hu, F. X. et al., "Magnetic Entropy Change in La $(Fe_{0.98}Co_{0.02})_{11.7}$ $Al_{1.3}$," J. Phys.: Condens. Matter, vol. 12 (2000) L691-696.

Hu, F. X. et al., "Magnetic Entropy Change and its Temperature Variation in Compounds $La(Fe_{1-x}Co_x)_{11.2}Si_{1.8}$," Journal of Applied Physics, vol. 92, No. 7, Oct. 1, 2002, American Institute of Physics (2002) pp. 3620-3623.

Ji, J. F. et al., "A Novel Technique for Manufacturing Metal-bonded Nd—Fe—B Magnets by Squeeze Casting," Metallurgical and Materials Transactions A (Physical Metallurgy and Material Science) ISSN 1073-5623, 2002, vol. 33, No. 3, pp. 637-646 (10p.) and Abstract of the same.

Katter, M. et al., "Magnetocaloric Properties of $La(Fe, Co, Si)_{13}$ Bulk Material Prepared by Powder Metallurgy," Vacuumschmelze GmbH and Company KG, IEEE Transactions on Magnetics, vol. 44, No. 11, Nov. 2008 (pp. 3044-3047).

Kneller, E., "Ferromagnetismus," Springer-Verlag, 1962 (1 page).

Mandal, K. et al., "Magnetocaloric Effect in Reactively-Milled $LaFe_{11.57}Si_{1.43}H_y$ Intermetallic Compounds," Journal of Applied Physics 102, 053906 (2007) American Institute of Physics (5 pages).

Massalski, Th.B., "Diagram 1074," Binary Alloy Phase Diagrams, Ed. J.L. Murray, L.H. Benett, H. Backer, American Society of Metals Ohio, (1986) 1074.

Massalski, Th.B., "Diagram 1108," Binary Alloy Phase Diagrams, Ed. J.L. Murray, L.H. Benett, H. Backer, American Society of Metals Ohio, (1986) 1108.

Otani, Y. et al., "Metal Bonded $Sm_2Fe_{17}N_{3-8}$ magnets," Department of Pure and Applied Physics, Trinity College, Dublin 2, Ireland, J. Appl. Phys. 69 (9), May 1, 1991, 1991 American Institute of Physics, pp. 6735-6737.

Saito, A. T. et al., "Magnetocaloric Effect of New Spherical Magnetic Refrigerant Particles of $La(Fe_{1-x-y}Co_xSi_y)_{13}$ Compounds," ScienceDirect, Journal of Magnetism and Magnetic Materials 310 (2007) 2808-2810, www.sciencedirect.com (pp. 2808-2810).

(56) References Cited

OTHER PUBLICATIONS

Tishin, A.M. at al., "The Magnetocaloric Effect and its Applications," Institute of Physics Publishing, Bristol and Philadelphia, IOP Publishing Ltd. 2003, pp. 371-375.
Villars, P. et al., "Diagram 10375," *Handbook of Ternary Alloy Phase Diagrams*, $2^{nd}$ Ed., ASM International, 10 (1997) 10375 (1 page).
Villars, P. et al., "Diagram 8502," *Handbook of Ternary Alloy Phase Diagrams*, $2^{nd}$ Ed., ASM International, 7 (1997) 8502 (1 page).
Wang, J. et al., "The Hydrogenation Behavior of $LaFe_{11.44}Si_{1.56}$ Magnetic Refrigerating Alloy," *Journal of Alloys and Compounds*, vol. 485 (2009) pp. 313-315, Elsevier B.V. (3 pages).
Zhang, H. et al., "The Spike in the Relation Between Entropy Change and Temperature in $LaFe_{11.83}Si_{1.17}$ Compound," ScienceDirect, Journal of Magnetism and Magnetic Materials 320 (2008) 1879-1883, www.sciencedirect.com (pp. 1879-1883).
Zhang, X. X. et al., "Magnetic Entropy Change in Fe-baied Compound $LaFe_{10.6}Si_{2.4}$," Applied Physics Letters, vol. 77, No. 19, Nov. 16, 2000, pp. 3072-3074 (2000) American Institute of Physics.
Zimm, C. et al., "Description and Performance of a Near-Room Temperature Magnetic Refrigerator," *Advances in Cryogenic Engineering*, vol. 43, Plenum Press, New York, (1998) pp. 1759-1766.
An English Translation of the Office Action (First Examination Notice) dated Feb. 8, 2012, issued in Chinese Patent Application No. 2008800078121 corresponding to U.S. Appl. No. 12/526,199.
Form PCT/IB/326; Form PCT/IB/373 and Form PCT/ISA/237 corresponding to PCT/IB/ 2009/051854 dated Nov. 17, 2011.
Notice of Reasons for Rejection corresponding to JP 2010-511750 dated Sep. 13, 2011.
Examination Report under Section 18(3) corresponding to GB Application No. 1015392.2 dated Sep. 14, 2011.
Japanese Office Action corresponding to JP Patent Application No. 2010-504885 dated Nov. 1, 2011.

\* cited by examiner

METHOD OF FABRICATING A WORKING COMPONENT FOR MAGNETIC HEAT EXCHANGE

BACKGROUND

1. Field

Disclosed herein is an article for magnetic heat exchange and a method of fabricating a working component for magnetic heat exchange.

2. Description of Related Art

Practical magnetic heat exchangers, such as that disclosed in U.S. Pat. No. 6,676,772, may include a pumped recirculation system, a heat exchange medium such as a fluid coolant, a chamber packed with particles of a working material which displays the magnetocaloric effect and a means for applying a magnetic field to the chamber. The working material can be said to be magnetocalorically active.

The magnetocaloric effect describes the adiabatic conversion of a magnetically induced entropy change to the evolution or absorption of heat. Therefore, by applying a magnetic field to a magnetocalorically active working material, an entropy change can be induced which results in the evolution or absorption of heat. This effect can be harnessed to provide refrigeration and/or heating.

Magnetic heat exchangers are, in principle, more energy efficient than gas compression/expansion cycle systems. They are also considered environmentally friendly as chemicals such as chlorofluorocarbons (CFC) which are thought to contribute to the depletion of ozone levels are not used.

In practice, a magnetic heat exchanger requires magnetocalorically active material having several different magnetic phase transition temperatures in order to provide cooling over a wider temperature range. In addition to a plurality of magnetic phase transition temperatures, a practical working medium should also have a large entropy change in order to provide efficient refrigeration and/or heating.

A variety of magnetocalorically active phases are known which have magnetic phase transition temperatures in a range suitable for providing domestic and commercial air conditioning and refrigeration. One such magnetocalorically active material, disclosed for example in U.S. Pat. No. 7,063,754, has a $NaZn_{13}$-type crystal structure and may be represented by the general formula $La(Fe_{1-x-y}T_yM_x)_{13}H_z$, where M is at least one element of the group consisting of Si and Al, and T may be one or more of transition metal elements such as Co, Ni, Mn and Cr. The magnetic phase transition temperature of this material may be adjusted by adjusting the composition.

Consequently, magnetic heat exchanger systems are being developed in order to practically realise the potential advantages provided by these magnetocalorically active materials. However, further improvements are desirable to enable a more extensive application of magnetic heat exchange technology.

SUMMARY

A method of fabricating a working component for magnetic heat exchange comprises selecting, for each of two or more portions of the working component, amounts of La, Fe, Si and one or more elements T and R suitable to produce a $La_{1-a}R_a(Fe_{1-x-y}T_ySi_x)_{13}H_z$ phase. T is one or more of the elements from the group consisting of Mn, Co, Ni and Cr and R is one or more of the elements from the group consisting of Ce, Nd, Y and Pr. The amount of the one or more elements T and R and the amount of Si is selected for each of the two or more portions to provide the two or more portions with differing Curie temperatures and similar sinter activities. The amount of the selected elements T and R are mixed with La, Fe and Si or precursors thereof in amounts suitable for producing the $La_{1-a}R_a(Fe_{1-x-y}T_ySi_x)_{13}H_z$ phase to produce two or more precursor powder mixtures. A green body is produced from the two or more precursor powder mixtures and heat treated at a temperature $T_{sinter}$ to produce a working component comprising two or more sintered portions. Each of the two or more sintered portions has a differing $T_c$ and a density d within a range of ±5% or ±2% of an average density $d_{av}$ of a total number of the sintered portions.

According to this method, the amounts of the constituent elements of the $La_{1-a}R_a(Fe_{1-x-y}T_ySi_x)_{13}H_z$ phase are selected for each of two or more portions of working component so that each portion has the different $T_c$ but has a similar sintering activity so that the two or more portions of the working component have a similar density and, in particular, a density, d, within a range of ±5% or ±2% of an average density, $d_{av}$, of a total number of the sintered portions. The $T_c$ of the portions may differ from one another by one or more degrees centigrade, for example.

The similar sinter activity enables the two or more sintered portions of the working component to be produced by heat treatment at the same temperature, i.e. the same $T_{sinter}$. Therefore, despite the differing compositions, mechanically stable sintered bodies can be fabricated at the same temperature. At the same time, the two or more portions can have differing Curie temperatures so that a working component produced can be used to magnetically exchange heat over a wider temperature range.

In an embodiment, a separate green body is formed from each of the two or more precursor powder mixtures so that the working component comprises two or more separate sintered portions. In this embodiment, two or more green bodies are formed each having a different composition corresponding to that of the two or more precursor powder mixtures. These two or more separate green bodies can be heated at the same sintering temperature $T_{sinter}$ to produce two or more separate sintered portions which, when arranged together, can provide the working component.

By heat treating the two or more separate green bodies together at the same temperature, production time can be reduced over a method in which the two or more green bodies are heated sequentially. By heat treating the two or more green bodies together, costs can be saved over a method in which each green body is heated at the same time, but in a separate furnace set to a different temperature.

In a further embodiment, a single monolithic green body is formed from the two or more precursor powder mixtures and is heat treated at a temperature $T_{sinter}$ to produce a single monolithic working component comprising the two or more sintered portions. In this context, monolithic is used to describe a single entity having integral portions of differing composition and differing Curie temperature. The differing portions are, however, macroscopically large and are arranged within the single monolithic working component such that the $T_c$ increases in a direction of the working component. Multi-phasic material in which a single plane of an article comprises a plurality of phases having differing $T_c$ is excluded from this definition of monolithic working component. Each portion may have at least one dimension that is greater than 5 mm.

In an embodiment, the two or more portions of the working component comprise differing silicon contents. The differing silicon content can be used to adjust the sinter activity of the two or more portions so that the sintered portions of the working component have a similar density as described above.

The two or more portions of the working component may also comprise differing values of a and y. The amount of the elements a and y can be selected so as to determine the Curie temperature of the two or more portions. Therefore, the two or more portions comprise differing elements T and/or R and/or values of a and y. For example, substituting the elements Nd, Pr, and/or Ce for La and/or Mn, Cr, V and Ti for Fe leads to a reduction in the Curie temperature. The Curie temperature can also be increased by substituting Fe with Co and/or Ni.

Differing values of a and y for a particular element, respectively, may result in differing sintering activities. In this case, the silicon content, x, can be adjusted so that the sintering activity of the portions is more similar so that the sintered portions have a density as required above.

In an embodiment, the element T is Mn. Increasing Mn contents, result in decreasing $T_c$ and increasing density in the working component for a given silicon content. Therefore, for increasing Mn contents, the silicon content is increased. In an embodiment, the amount of manganese $Mn_m$ to produce the desired Curie temperature $T_c$ is selected according to $T_c$ (° C.)=80.672−26.957×$Mn_m$, wherein $Mn_m$ is the metallic weight fraction of manganese.

As used herein, the subscript m is used to denote the metallic weight fraction. The metallic weight fraction is defined herein as the result of a calculation separating and removing the rare earth content, RE, which is bonded in the form of RE oxides and RE nitrides from the total RE composition according to the following formulas for RE=La:

$$La_2O_2 = 6.79*O$$

$$LaN = 10.9*N$$

$$f = \frac{100}{100 - La_2O_3 - LaN}$$

Consequently, $$La_m = (La - 5.8*O - 9.9*N)*f$$

$$Si_m = Si*f$$

$$Co_m = Co*f$$

$$Mn_m = Mn*f$$

where the subscript m denotes the metallic weight fraction and La, O, N, Si, Co and Mn and so on denote the weight percent of this element.

In a first approximation, the metallic RE content can also be calculated for La-rich alloys as:

$$RE_m = (RE - 5.8*O - 9.9*N) \times \frac{100}{100 - 6.8*O - 10.9*N}$$

For Si, Co, Mn and so on, the metallic contents are close to the total content as the factor f is around 1.02. However, for the RE element, there is a larger difference. For example, in the embodiments described here, a content of around 18 wt % La is used to provide a metallic content of 16.7 wt % which corresponds to the stoichiometry of the 1: 13 phase.

In an embodiment, the amount of silicon lies within the range 0.05≤x≤0.2.

In an embodiment, T is Mn and optionally Co and the amount of silicon is selected according to $Si_m$=3.85−0.0573×$Co_m$−0.045×$Mn_m^2$+0.2965×$Mn_m$, wherein $Si_m$ is the metallic weight fraction of silicon, $Mn_m$ is the metallic weight fraction of manganese, $Co_m$ is the metallic weight fraction of cobalt in order to provide two or more portions comprising the element Mn and optionally cobalt as a substituting element which have a density d within a range of ±5% or within ±2% of an average density $d_{av}$ of a total number of the sintered portions.

The sintered portions comprise a silicon content Si, $Si_{act}$, that, in an embodiment, lies within ±5% of $Si_m$ or within ±2% of $Si_m$.

The $La_{1-a}R_a(Fe_{1-x-y}T_ySi_x)_{13}H_z$ phase has a $NaZn_{13}$-type structure and is magnetocalorically active. If hydrogen is present, it is incorporated interstitially within the $NaZn_{13}$ structure.

A magnetocalorically active material is defined herein as a material which undergoes a change in entropy when it is subjected to a magnetic field. The entropy change may be the result of a change from ferromagnetic to paramagnetic behaviour, for example. The magnetocalorically active material may exhibit, in only a part of a temperature region, an inflection point at which the sign of the second derivative of magnetization with respect to an applied magnetic field changes from positive to negative.

A magnetocalorically passive material is defined herein as a material which exhibits no significant change in entropy when it is subjected to a magnetic field.

A magnetic phase transition temperature is defined herein as a transition from one magnetic state to another. Some magnetocalorically active phases exhibit a transition from antiferromagnetic to ferromagnetic which is associated with an entropy change. Magnetocalorically active phases such as $La_{1-a}R_a(Fe_{1-x-y}T_yM_x)_{13}H_z$ exhibit a transition from ferromagnetic to paramagnetic which is associated with an entropy change. For these materials, the magnetic transition temperature can also be called the Curie temperature.

As discussed above, the Curie temperature of the working component can be adjusted by adjusting the amount of the substituting elements R and T. In one embodiment, T is Mn and the Curie temperature $T_c$ of the working component lies within ±10K of the value of the Curie temperature, $T_{c(calc)}$, derived from the relationship $T_{c(calc)}$ (° C.)=80.672−26.957×$Mn_m$, wherein $Mn_m$ is the metallic weight fraction of manganese. In a further embodiment, $T_c$ lies within ±5K of $T_{c(calc)}$.

In further embodiments, the amount of the element M can be adjusted depending on the type and amount of the substituting elements R and T in order to achieve a larger entropy change in the $La_{1-a}R_a(Fe_{1-x-y}T_yM_x)_{13}H_z$ phase. In one embodiment, M is Si and the metallic weight fraction of Si, $Si_{act}$, lies within ±5% of the value of the metallic weight fraction of silicon, $Si_m$, derived from the relationship $Si_m$=3.85−0.0573×$Co_m$−0.045×$Mn_m^2$+0.2965×$Mn_m$, wherein $Mn_m$ is the metallic weight fraction of Mn and $Co_m$ is the metallic weight fraction of Co. In a further embodiment, $Si_{act}$ lies within ±−2% of $Si_m$.

The working component can provided in a number of physical forms. For example, a sintered block or a reactively sintered block.

The term "reactive sintered" describes an article in which grains are joined to congruent grains by a reactive sintered bond. A reactive sintered bond is produced by heat treating a mixture of precursor powders of differing compositions. The particles of different compositions chemically react with one another during the reactive sintering process to form the desired end phase or product. The composition of the particles, therefore, changes as a result of the heat treatment. The phase formation process also causes the particles to join together to form a sintered body having mechanical integrity.

Reactive sintering differs from conventional sintering since, in conventional sintering, the particles consist of the desired end phase before the sintering process. The conventional sintering process causes a diffusion of atoms between neighbouring particles so as join the particles to one another. The composition of the particles, therefore, remains unaltered as a result of a conventional sintering process.

The working component may further comprise a magnetocalorically passive phase. This magnetocalorically passive phase may provide a matrix in which the magnetocalorically active phase is embedded. Alternatively, the magnetocalorically passive phase may provide a coating of a massive magnetocalorically active block. In both cases, the magnetocalorically passive phase may provide a corrosion resistance coating to prevent corrosion of the magnetocalorically active phase.

The precursor powder mixture may be pressed to form one or more green bodies before the heat treating is carried out. Isostatic or die pressing may be used. This embodiment may be carried out to produce the working component in the form of a reactively sintered block.

In a further group of embodiments, the working component is further hydrogenated.

The $La_{1-a}R_a(Fe_{1-x-y}T_yM_x)_{13}H_z$ phase has a $NaZn_{13}$-type structure and, if it includes hydrogen, the hydrogen atoms occupy intersitital sites in the $NaZn_{13}$-type structure. The hydrogen can be introduced into these interstitial sites after formation of the $La_{1-a}R_a(Fe_{1-x-y}T_ySi_x)_{13}H_z$ phase. The $T_c$ of a substantially fully hydrogenated ternary $La(Fe,Si)_{13}H_z$ phase may be around +85° C. The $T_c$ of the $La_{1-a}R_a(Fe_{1-x-y}T_yM_x)_{13}H_z$ phase may be adjusted by adjusting the hydrogen content as well as by substitution of metallic elements for La and Fe.

Hydrogenation may be performed by heat treating the working component under a hydrogen partial pressure of 0.5 to 2 bars. The hydrogen partial pressure may be increased during the hydrogenation heat treatment. The hydrogenation may comprise heat treating at a temperature in the range of 0° C. to 100° C. and, preferably, in the range 15° C. to 35° C. A final heat treatment at temperatures of less than 100° C. in a hydrogen atmosphere, preferably at 1.5 to 2 bars has been found to reliably produce working components with the hydrogen content, z, of at least 90% of the hydrogen saturation value, $z_{sat}$.

In further embodiments, the hydrogenation comprises a dwell at a temperature $T_{hyd}$, wherein 400° C.≤$T_{hyd}$≤500° C. and may comprises a dwell at a temperature $T_{hyd}$ in the range 400° C.≤$T_{hyd}$≤500° C. followed by cooling to a temperature of less than 100° C.

In further embodiments, the working component is only subjected to hydrogen gas above a threshold temperature. In one embodiment, the hydrogenation comprises heating the working component from a temperature of less than 50° C. to at least 300° C. in an inert atmosphere and introducing hydrogen gas only when a temperature of at least 300° C. is reached. The working component is maintained in a hydrogen containing atmosphere at a temperature in the range 300° C. to 700° C. for a selected duration of time, and cooled to a temperature of less than 50° C. to provide a second working component. This method has been found to result in second working components with a hydrogen content, z, of 90% or more of the hydrogen saturation content, $z_{sat}$, and also in mechanically stable second working components. This hydrogenation process may be used to produce second working components in the form of the sintered block or a reactively sintered block.

In further embodiments of a method in which the working component is subjected to hydrogen only at temperatures above a threshold temperature, the working component may be cooled to a temperature of less than 50° C. in a hydrogen-containing atmosphere.

In particular, it is found that if hydrogen is first introduced at temperatures lower than around 300° C., the working component may disintegrate into pieces or at least lose its previous mechanical strength. However, these problems may be avoided by first introducing hydrogen when the working component is at a temperature of at least 300° C.

Alternatively, or in addition, hydrogen gas is introduced only when a temperature of 400° C. to 600° C. is reached. After hydrogenation, the working component may comprise at least 0.18 wt % hydrogen.

In order to form the working component comprising a $La_{1-a}R_a(Fe_{1-x-y}T_yM_x)_{13}H_z$ phase with z=0, the precursor powder mixture may be heat treated at a temperature $T_{sinter}$, wherein 1050° C.≤$T_{sinter}$≤1200° C.

A multi-step heat treating process may also be used to heat treat the powder mixture and produce the working component. In an embodiment, the multi-step heat treatment comprises a first dwell at $T_{sinter}$ for a time $t_1$ in vacuum and a time $t_2$ in argon, followed by cooling to a temperature $T_1$, wherein $T_1$<$T_{sinter}$, followed by a second dwell at $T_1$ for a time $t_3$ followed by rapid cooling. Typical parameter ranges for such a multi-step heat treatment may be 1000° C.≤$T_1$≤1080° C. and/or 0.5 h≤$t_1$≤10 h and/or 0.5 h≤$t_2$≤10 h and/or 1 h≤$t_3$≤20 h and/or rapid cooling at a rate of 5 to 200° C./min.

The mixing of the precursor powders may be carried out using steel balls and, optionally, isopropanol in order to more intimately mix the elements. The milling time may be restricted to a maximum of 1 hour.

The two or more separate portions of the working component or the monolithic working component comprising two integral portions may be provided in the form of a block, whether it be a sintered block or a reactively sintered block. It may be desirable to work the working component by removing at least one portion to change its outer dimensions. For example, it may be desirable to singulate the working component into two or more separate pieces, and/or adjust the outer dimensions and/or it may be desirable to introduce channels or through holes in the working component through which a fluid heat exchange medium can flow.

The at least one portion may be removed from the working component by one or more of machining, mechanical grinding, mechanical polishing, chemical-mechanical polishing, electric spark cutting, wire erosion cutting, laser cutting and laser drilling or water beam cutting.

However, it has been found that the magnetocalorically active phase is difficult to work since it is mechanically unstable. Therefore, a number of alternative measures may be taken in order to remove one or more portions of the working component so as to reliably achieve the desired outer dimensions.

In one group of embodiments, the at least one portion of the working component is removed whilst the working component remains at a temperature above the Curie temperature or below the Curie temperature. This has been found to avoid undesired cracking of the working component.

Heating or cooling of the article may be performed by applying a heated or cooled working fluid such as water, an organic solvent or oil, for example.

Without being bound by theory, if, during working, the temperature of the article changes so that the article undergoes a phase change, this phase change may result in the formation of cracks within the article.

The magnetocalorically active phase may exhibit a temperature dependent transition in length or volume. In this case, the at least one portion may be removed at a temperature above the transition or below the transition to avoid a transition in length or volume during removal of the portion or portions. The temperature at which this transition of length or volume occurs may correspond roughly to the Curie temperature.

The transition may be characterized by $(L_{10\%}-L_{90\%}) \times 100/L(T) > 0.35$, wherein L is the length of the article at temperatures below the transition, $L_{10\%}$ is the length of the article at 10% of the maximum length change and $L_{90\%}$ at 90% of the maximum length change. This region characterizes the most rapid change in length per unit of temperature T.

Performing the working of the article by removing one or more portions, whilst the article is maintained at a temperature at which the phase change does not occur, avoids the phase change occurring in the article during working and avoids any tension associated with the phase change occurring during working of the article. Therefore, the article may be worked reliably, the production quota increased and production costs reduced.

A combination of these methods may also be used on a single article. For example, the article may be singulated into two or more separate pieces by removing a portion of the article by wire erosion cutting and then the surfaces subjected to mechanical grinding, removing a further portion, to provide the desired surface finish or more exactly defined outer dimensions.

Typically, removing portions of the working component, for example, by grinding or sawing, creates heat in the working component due to the friction between the tool and the working component. Therefore, by actively cooling at a temperature sufficient to compensate for this heat generation, the magnetocalorically active phase is prevented from undergoing a phase change so that the working component can be reliably formed to the desired outer dimensions.

In a further group of embodiments, the working component is heat treated so as to decompose the magnetocalorically active phase to produce an intermediate article. This intermediate article can then be worked, for example, to remove at least one portion, and the intermediate article or articles can be reheat treated after working to reform the magnetocalorically active phase. By removing portions of the intermediate article which does not include a magnetocalorically active phase, such as a $La_{1-a}R_a(Fe_{1-x-y}T_yM_x)_{13}H_z$ phase, in a substantial amount, the intermediate article can be reliably worked without undesirable cracking of the intermediate article.

Particularly in the case of working articles comprising the magnetocalorically active phase $La_{1-a}R_a(Fe_{1-x-y}T_yM_x)_{13}H_z$ and having larger dimensions, for example blocks having dimensions of at least 5 mm or several tens of millimeters, the inventors have previously observed that undesirable cracks were formed in the articles during working which limited the number of smaller articles with the desired dimensions which could be produced from the large article.

The inventors further observed that this undesirable cracking can be largely avoided by heat treating the article to form an intermediate article which comprises a permanent magnet. The intermediate article comprises a coercive field strength of greater than 10 Oe according to the definition of permanent magnet used herein.

Without being bound by theory, it is thought that the observed cracking articles comprising the magnetocalorically active phase during working may be caused by a temperature dependent phase change occurring in the magnetocalorically active phase. The phase change may be a change in entropy, a change from ferromagnetic to paramagnetic behaviour or a change in volume or a change in linear thermal expansion.

Performing the working of the article whilst the article is in a non-magnetocalorically active working condition avoids the phase change occurring in the article during working and avoids any tension associated with the phase change occurring during working of the article. Therefore, the article may be worked reliably, the production quota increased and production costs reduced.

In one embodiment, the working component is heat treated at a temperature $T_2$ to form an intermediate article comprising at least one permanently magnetic phase, wherein $T_2 < T_{sinter} < T_2$ may be in the range of 600° C. to 1000° C.

The working component may be heat treated under conditions selected so as to decompose the $La_{1-a}R_a(Fe_{1-x-y}T_yM_x)_{13}H_z$ phase having a $NaZn_{13}$-type crystal structure and form at least one $\alpha$-Fe-type phase in the intermediate article. The heat treatment conditions may be selected so as to produce an intermediate article comprising a $\alpha$-Fe content of greater than 50 vol %. The intermediate article may then be worked at room temperature.

After the intermediate article has been worked by removing at least one portion of the intermediate article, the intermediate article can be heat treated to produce a final working component product comprising at least one magnetocalorically active $La_{1-a}R_a(Fe_{1-x-y}T_yM_x)_{13}H_z$ phase. The intermediate article may be heat treated at a temperature $T_3$ to produce the final product comprising at least one magnetocalorically active $La_{1-a}R_a(Fe_{1-x-y}T_yM_x)_{13}H_z$ phase, wherein $T_3 > T_2$. In an embodiment, $T_3 < T_{sinter}$. $T_3$ may be around 1050° C.

The composition of the working component may be selected so as to produce a reversible decomposition of the phase with the $NaZn_{13}$-type crystal structure at $T_2$ and to produce a reformation of the $NaZn_{13}$-type crystal structure at $T_3$.

In an embodiment, the composition of the at least one $La_{1-a}R_a(Fe_{1-x-y}T_yM_x)_{13}H_z$ phase is selected so as to exhibit a reversible phase decomposition reaction. This enables the $La_{1-a}R_a(Fe_{1-x-y}T_yM_x)_{13}H_z$ phase to be formed in a first step, decomposed to provide the working component and then afterwards reformed in a further heat treatment once working is complete.

The composition of the at least one $La_{1-a}R_a(Fe_{1-x-y}T_yM_x)_{13}H_z$ phase may be selected so as to exhibit a reversible phase decomposition reaction into at least one $\alpha$-Fe-based phase and La-rich and Si-rich phases.

In a further embodiment, the composition of the at least one $La_{1-a}R_a(Fe_{1-x-y}T_yM_x)_{13}H_z$ phase is selected so that the at least one $La_{1-a}R_a(Fe_{1-x-y}T_yM_x)_{13}H_z$ phase is formable by liquid-phase sintering. This enables an article with a high density to be produced and also an article with a high density to be produced in an acceptable time.

In an embodiment, the intermediate article comprises a composition, in total, in which a=0, T is Co and M is Si and z=0 and in a further embodiment 0<y≤0.075 and 0.05<x≤0.1 when a=0, T is Co and M is Si and z=0.

In further embodiments, the intermediate article comprises the following magnetic properties: $B_r$>0.35T and $H_{cJ}$>80 Oe and/or $B_s$>1.0 T.

The intermediate article may have a coercive field strength of greater than 10 Oe but less than 600 Oe. Articles with such a coercive field strength are sometimes called half hard magnets.

The intermediate article may comprise a composite structure comprising a non-magnetic matrix and a plurality of α-Fe-inclusions distributed in the non-magnetic matrix. As used herein, non-magnetic refers to the condition of the matrix at room temperature and includes paramagnetic and diamagnetic materials as well as ferromagnetic materials with a very small saturation polarization.

An article for magnetic heat exchange is provided that comprises a monolithic working component comprising two or more portions. The two or more portions comprise amounts of La, Fe, Si and one or more elements T and R suitable to produce a $La_{1-a}R_a(Fe_{1-x-y}T_ySi_x)_{13}Hz$ phase, wherein T is one or more of the elements from the group consisting of Mn, Co, Ni and Cr and R is one or more of the elements from the group consisting of Ce, Nd, Y and Pr. The amount of the one or more elements T and R and the amount of Si is selected for each of the two or more portions to provide the two or more portions with differing Curie temperatures.

Therefore, a single entity is provided which comprises two or more portions with differing Curie temperatures which are integrally arranged within the single entity so that the monolithic working component, when used in a magnetic heat exchanger, is able to exchange heat over a wider temperature range than would be possible using a single entity including a random mixture of two phases having differing Curie temperatures. For example, the two portions may be arranged within the monolithic working component so that two sublayers are formed within the monolithic working component, each sublayer having a different $T_c$ to the others. Each sublayer may have a thickness of 5 mm or greater.

The monolithic working component having two or more differing Curie temperatures ($T_a$) has the advantage that it is more simple to accommodate in practical magnetic heat exchanger. The problems associated with powders, such as clogging of filters and pumps, are avoided. Also, only a single article has to be accommodated rather than a plurality of articles, as is the case if a plurality of separate sintered or reactively sintered blocks are provided.

The $T_c$ of each portion may be adjusted by adjusting the type of metallic substituting element R and T and/or the amount of the element included. However, different elements and different amounts of the same element can lead to a change in the sinter activity. In this case, if two portions of differing metallic content are heated at the same sintering temperature, one portion may sinter to form stable block whereas the other portion has not yet reached its optimum sintering temperature and remains mechanically fragile.

A monolithic working component having two or more differing Curie temperatures can be fabricated since the amount of silicon can be adjusted depending on the amount or type of metallic elements so that the differing phases have a similar sintering activity. Therefore, the two or more integral portions of the monolithic working components have a similar density so that the working component remains intact despite comprising macroscopic portions having differing Curie temperatures and differing metallic constituents.

In an embodiment, the two or more portions each have a density d within a range of ±5% or ±2% of an average density $d_{av}$ of a total number of portions. This enables a mechanically stable monolithic working component with differing Curie temperatures and, therefore, a larger working temperature range to be fabricated.

The two or more portions of the working component may comprise differing silicon contents and, for example, may comprise an increasing or decreasing silicon content for increasing amounts of one or more of the elements R and T.

In an embodiment, the amount of silicon lies within the range 0.05≤x≤0.2.

The sintered bodies may comprise a silicon content Si, $Si_{act}$, that lies within ±5% or ±2% of $Si_m$, wherein $Si_m=3.85-0.0573 \times Co_m-0.045 \times Mn_m^2+0.2965 \times Mn_m$, wherein $Si_m$ is the metallic weight fraction of silicon, $Mn_m$ is the metallic weight fraction of manganese, $Co_m$ is the metallic weight fraction of cobalt.

The monolithic working component may comprise sequentially arranged portions having sequentially increasing Curie temperatures or sequentially decreasing Curie temperatures.

Each of the two or more portions may comprise one or more of the elements R and T in the following amounts: 0≤a≤0.5, 0.003≤y≤0.2, or 0.05≤a≤0.5, 0≤y≤0.2, or 0.05≤a≤0.5, 0.003≤y≤0.2.

Embodiments will now be described with reference to the accompanying drawings.

DETAILED DESCRIPTION OF SPECIFIC EMBODIMENTS

Figure 1:
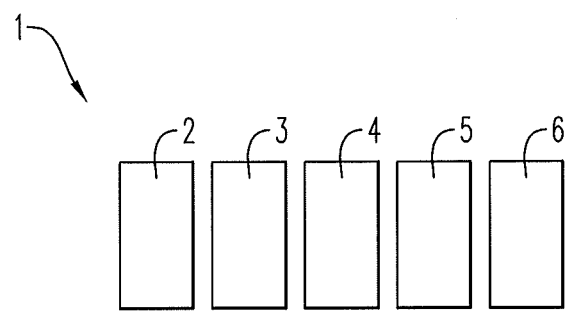
FIG. 1 illustrates a schematic diagram of an article for magnetic heat exchange comprising five separate working components.

FIG. 1 illustrates an article 1 for magnetic heat exchange comprising separate five working components 2, 3, 4, 5, 6, each having the form of a reactively sintered block. Each of the working components 2, 3, 4, 5, 6 comprises a magnetocalorically active phase comprising $La_{1-a}R_a(Fe_{1-x-y}T_yM_x)_{13}H_z$. M may be one or more of the elements from the group consisting of Al and Si, T may be one or more of the elements from the group consisting of Co, Ni, Mn, Cr, Cu, Ti and V and R may be one or more of the elements from the group consisting of Ce, Nd, Y and Pr.

In this embodiment, the hydrogen content, z, of each of the working components is 90% or higher of a hydrogen saturation value, $z_{sat}$.

For a sample with selected values of a, x and y, the hydrogen saturation content can be experimentally determined by heating a hydrogenated sample in a hydrogen containing atmosphere at a temperature in the range 20° C. to 100° C. for at least 1 hour. The hydrogen-containing atmosphere may comprise a hydrogen partial pressure in the range of 0.5 bar to 2.0 bar. The sample may be preheated in the hydrogen atmosphere to temperatures between 200° C. to 500° C. before it is held at a temperature of 20° C. to 100° C. for at least one hour. The preheating step aids in avoiding activation difficulties.

If the hydrogen content of the sample does not measurably increase, the sample can be said to be fully hydrogenated and contain the hydrogen saturation content, $z_{sat}$. The hydrogen content of the sample can be measured using techniques such as the hot gas extraction method. Alternatively, or in addition, the change of the hydrogen content can be evaluated by measuring the Curie temperature before and after this heat treatment.

The values of a, x and y are selected to provide each working component 2, 3, 4, 5, 6 with a different Curie temperature $T_c$. The differing Curie temperatures are not achieved, to a substantial extent, by partially dehydrogenating the working components, but by selecting appropriate amounts of elements R, T and M.

$T_{cmax}$ is the Curie temperature of the respective working component $La_{1-a}R_a(Fe_{1-x-y}T_yM_x)_{13}H_z$ phase comprising a hydrogen content $z=z_{sat}$ and said selected values of a, x and y for each working component 2, 3, 4, 5, 6. The working components 2, 3, 4, 5, 6 are at least 90% fully hydrogenated so that the Curie temperature $T_c$ of each of the working components lies within 20 Kelvin of $T_{cmax}$. In other words $(T_{cmax}-T_c) \leq 20K$. In this particular embodiment, for each of the working components 2, 3, 4, 5, 6, the element M is Si, the element T is Mn and the element R is omitted.

The Curie temperature $T_c$ of the working components 2, 3, 4, 5, 6 lies within ±10K of the value of the Curie temperature, $T_{c(calc)}$, derived from the relationship $T_{c(calc)}$ (° C.)$=80.672-26.957 \times Mn_m$, wherein $Mn_m$ is the metallic weight fraction of manganese. By adjusting the amount of manganese in the working component 2, 3, 4, 5, 6, the Curie temperature of the working component can be selected to lie within a range of +80° C. to −90° C. The $T_c$ decreases for increasing Mn contents.

For increasing manganese contents, the sinter activity is observed to increase leading to an increase in the density of the working component. To counteract this increase in density, the silicon content can be increased.

The values of Si, x, and Mn, y, fulfil the following relationship for each of the working components: the metallic weight fraction of Si, $Si_{act}$, lies within ±5% of the value of the metallic weight fraction of silicon, $Si_m$, derived from the relationship $Si_m=3.85-0.0573 \times Co_m-0.045 \times Mn_m^2+0.2965 \times Mn_m$. By adjusting the silicon content in relation to the amounts of substituting metal Mn, the sinter activity of the $La_{1-a}R_a(Fe_{1-x-y}T_ySi_x)_{13}H_z$ phase can be adjusted so that, after sintering at a temperature $T_{sinter}$, all of the working components 2, 3, 4, 5, 6, have a density d which is similar, for example within a range of ±5% or ±2% of an average density $d_{av}$ of a total number of the sintered portions.

In this embodiment, each of the working components 2, 3, 4, 5, 6 is produced by reactively sintering the elements or precursors thereof to form a working component in the form of a reactively sintered block.

The working components 2, 3, 4, 5, 6 may also be provided as a composite further comprising a magnetocalorically passive phase, such as copper, as a matrix in which the magnetocalorically active phase is embedded.

The working components 2, 3, 4, 5, 6 are arranged in the article 1 so that the $T_c$ of the working components increases sequentially in a long direction of the article 1. This arrangement produces a better overall cooling performance when the article 1 is used in a magnetic heat exchanger.

Figure 2:
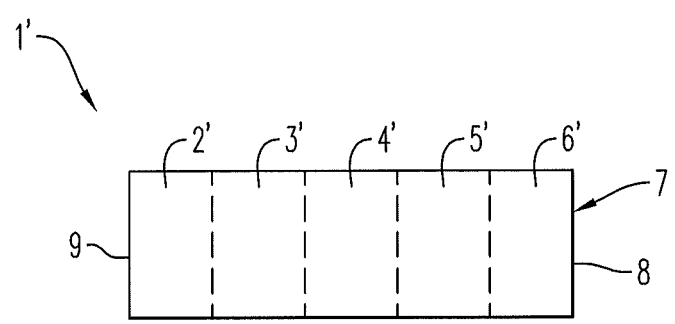
FIG. 2 illustrates a schematic diagram of an article for magnetic heat exchange comprising a monolithic working component having five integral working component portions.

FIG. 2 illustrates an article 1' according to a second embodiment. The article 1' includes five working components 2', 3', 4' 5' 6' as in the first embodiment illustrated in FIG. 1. These working components 2', 3', 4' 5' 6' also comprise the compositions of the five working components 2, 3, 4, 5, 6 of the first embodiment.

However, in the second embodiment, the five working components 2', 3', 4' 5' 6' are provided in the form of a monolithic working component 7. Therefore, the monolithic working component 7 comprises five integral portions 2', 3', 4' 5' 6' each of which have a differing $T_c$, differing values of a and/or y and differing silicon contents. The sinter density of the five portions 2', 3', 4' 5' 6' is, however, similar and within a range of ±5% or ±2% of an average density $d_{av}$ of a total number of the portions as for the first embodiment. Again, the density of the portions 2', 3', 4' 5' 6' within this monolithic working component 7 is controlled by adjusting the silicon content in relation to the type and amount of the metallic substituting elements, which in the second embodiment is Mn.

Therefore, the monolithic working component 7 can be fabricated with a $T_c$ that varies form one end 8 to the other end 9 and which sequentially or gradually increases form one end 8 to the other end 9. By appropriately selecting the silicon content for the composition of the metallic element required to produce the desired $T_c$ for a particular portion, the monolithic working component 7 has a similar density throughout its volume. This provides the monolithic working component 7 with a mechanical integrity that is substantially constant throughout its volume.

In a first embodiment, the silicon content of the five working components 2, 3, 4, 5, 6 of the first embodiment and of the five working components 2', 3', 4' 5' 6' of the second embodiment can be described by, $Si_{act}$, lies within ±5% of the value of the metallic weight fraction of silicon, $Si_m$, derived from the relationship $$Si_m=3.85-0.0573 \times Co_m-0.045 \times Mn_m^2+0.2965 \times Mn_m.$$

The articles 1, 1' of the first and second embodiments may be fabricated using one of the following embodiments.

To fabricate separate working components, as in the first embodiment, each composition of powder is used separately, for example each composition of powder is used to form a separate green body by pressing. To fabricate a monolithic working component with integral portions of differing composition, powders of differing composition may be layered one on top of the other to form a single green body.

In the third embodiment, the following relationships were used as a starting point to select appropriate amounts of the elements La, Mn, and Si to fabricate working components having a differing $T_c$ in a $La(Fe_{1-x-y}Mn_ySi_x)_{13}H_z$ system:

$$T_c=75.57-23.72 \times Mn_m \quad (1)$$

whereby $T_c$ is measured in ° C., $Mn_m$ is the metallic weight fraction of Mn and the relationship holds for fully hydrogenated samples.

The relationship between the metallic weight fraction of silicon $Si_m$ and the metallic weight fraction of manganese $Mn_m$ of the following equation was used to select the amount of silicon for a given manganese content and a given $T_c$:

$$Si_m=3.86+0.176 \times Mn_m \quad (2)$$

Using these two equations, three compositions were selected and three fine powders were fabricated from manganese-containing melts. The compositions and calculated expected $T_{c,hyd}$ temperatures for fully hydrogenated sample are summarised in Table 1.

Each of these powders was mixed for 30 minutes and 60 g batches of the powders were isostatically pressed to form a green body. A green body of each composition was heated at one of three sintering temperatures before cooling in 1 hour to 1050° C., where the temperature was held for 6 hours before cooling to room temperature. The three sintering temperatures were 1100° C., 1120° C. and 1140° C. At each temperature, the samples were held for 3 hours in a vacuum and 1 hour in argon before cooling to 1050° C.

TABLE 1

|  | $La_m$ (wt. %) | $Si_m$ (wt. %) | $Mn_m$ (wt. %) | $T_{c,hyd}$ (° C.) |
|---|---|---|---|---|
| MFP-1123 | 16.7 | 4.40 | 3.04 | 3.5 |
| Mix 1123/1124 | 16.7 | 4.31 | 2.56 | 14.9 |
| MFP-1124 | 16.7 | 4.22 | 2.08 | 26.3 |

Figure 3:
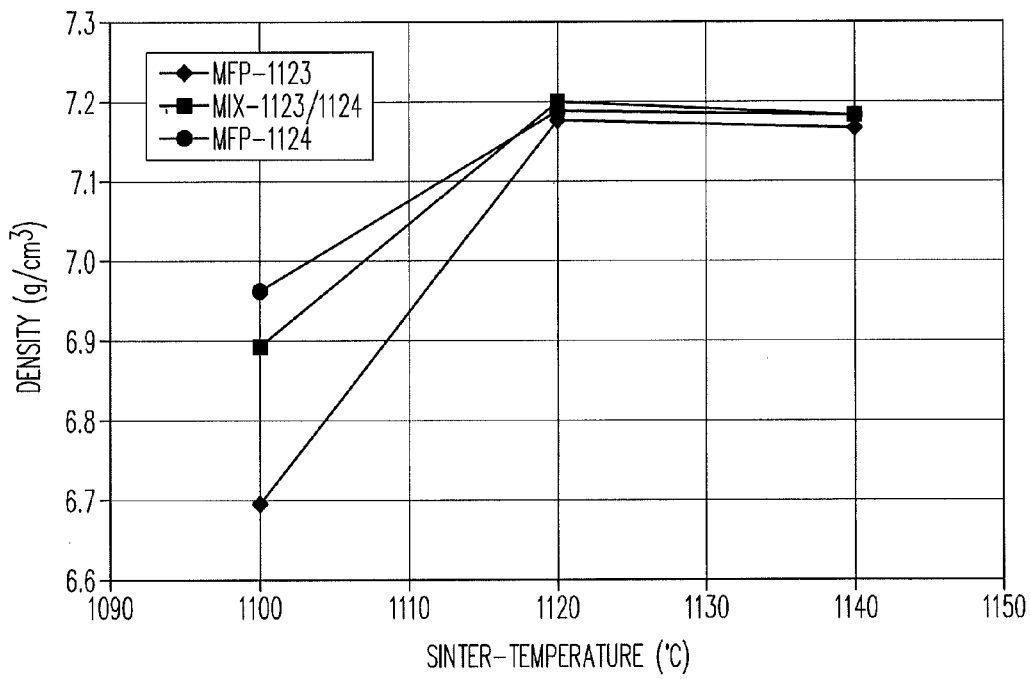
FIG. 3 illustrates a graph illustrating density as a function of sinter temperature for a third embodiment.
Figure 4:
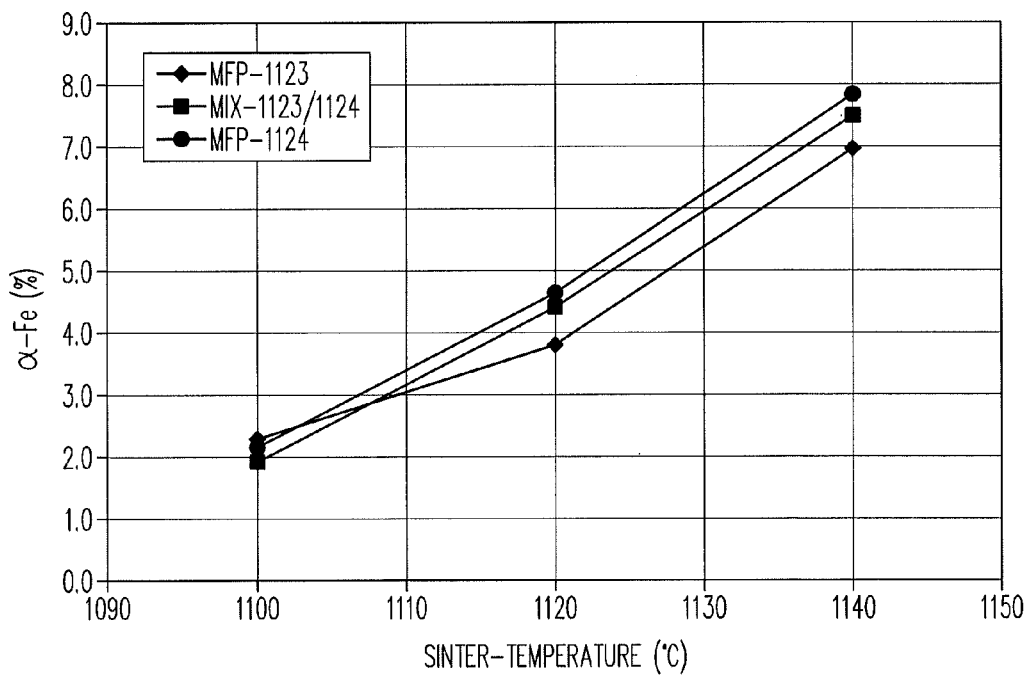
FIG. 4 illustrates a graph illustrating α-Fe content as a function of sinter temperature for the third embodiment.

The density and α-Fe (alpha iron) content were measured after this heat treatment and the results are summarised in Table 2 and FIGS. 3 and 4. The samples sintered at the 1100° C. and 1120° C. have an α-Fe content of less than 5 volume percent which indicates that a high volume fraction of the desired $La_{1-a}R_a(Fe_{1-x-y}T_ySi_x)_{13}$ phase has been produced. For the samples heated at 1140° C., the α-Fe content is higher at between 7 and 8 volume percent.

TABLE 2

|  | TS = 1100° C. | | TS = 1120° C. | | TS = 1140° C. | |
|---|---|---|---|---|---|---|
|  | density (g/cm³) | α-Fe (%) | density (g/cm³) | α-Fe (%) | density (g/cm³) | α-Fe (%) |
| MFP-1123 | 6.694 | 2.3 | 7.176 | 3.8 | 7.164 | 7.0 |
| Mix 1123/1124 | 6.893 | 1.9 | 7.198 | 4.4 | 7.18 | 7.5 |
| MFP-1124 | 6.961 | 2.2 | 7.187 | 4.6 | 7.18 | 7.8 |

As these results show, an increase of the silicon content with increasing manganese content provided according to the equation above has not resulted in a desired constant, or substantially constant, sinter density as desired. In particular, the density of the samples sintered at 1100° C. decreases with increasing manganese content. This indicates that the silicon content may have been chosen to increase too much in order to compensate for the effect of the increasing manganese content on density.

The samples sintered at 1120° C. were hydrogenated using the following process.

The samples were heated under vacuum to the temperature of 500° C. and held at this temperature for an hour in argon atmosphere. Afterwards, the hydrogen partial pressure was increased to 0.5 bar, 1.0 bar, 1.5 bar and 1.9 bar and held at each of these pressures for 15 minutes. After the hydrogen partial pressure had reached the value of 1.9 bars, the furnace was switched off and the samples allowed to furnace cool to room temperature.

The magnetocaloric properties of these hydrogenated samples are summarised in Table 3. The Curie temperature $T_c$ of the samples lies within a small range of the expected $T_c$ according to the equation above. However, the entropy change $\Delta S_{m,max}$ is observed to decrease upon the increasing manganese content.

TABLE 3

| sample | composition | density (g/cm³) | $-\Delta S_{m,max}$ J/(kg·K) | $-\Delta S_{m,max}$ (kJ/(m³·K) | $T_{PEAK}$ (° C.) | $\Delta T_{FWHM}$ (° C.) | α-Fe (%) |
|---|---|---|---|---|---|---|---|
| VZ1001-MCE-4B1 | MFP-1123 | 7.176 | 6.18 | 44.35 | −1.88 | 16.48 | 3.8 |
| VZ1001-MCE-5B1 | Mix 1123/1124 | 7.198 | 7.66 | 55.14 | 10.97 | 13.34 | 4.4 |
| VZ1001-MCE-6B1 | MFP-1124 | 7.187 | 9.68 | 69.57 | 26.89 | 10.31 | 4.6 |

In a fourth embodiment, a further set of samples were fabricated to further reduce the difference in the sinter density and also to increase the entropy change achieved, in particular for samples including higher manganese contents.

Two samples were fabricated having differing manganese contents that are expected to give a $T_c$ of 3.5° C. and 26.5° C., respectively, when the samples are fully hydrogenated. The compositions are summarised in Table 4. In this embodiment, the silicon content was held constant.

TABLE 4

|  | $La_m$ (wt. %) | $Si_m$ (wt. %) | $Mn_m$ (wt. %) | $T_{c,hyd}$ (° C.) |
|---|---|---|---|---|
| MFP-1127 | 16.7 | 4.31 | 3.04 | 3.5 |
| MFP-1128 | 16.7 | 4.31 | 2.07 | 26.5 |

A sample of each composition was heated at one of three sinter temperatures TS; 1100° C., 1120° C. and 1140° C., where it was held three hours in vacuum and then 1 hour in argon. In each case, the samples were cooled in 1 hour to 1050° C. This temperature was held 6 hours before cooling the samples to room temperature.

Figure 5:
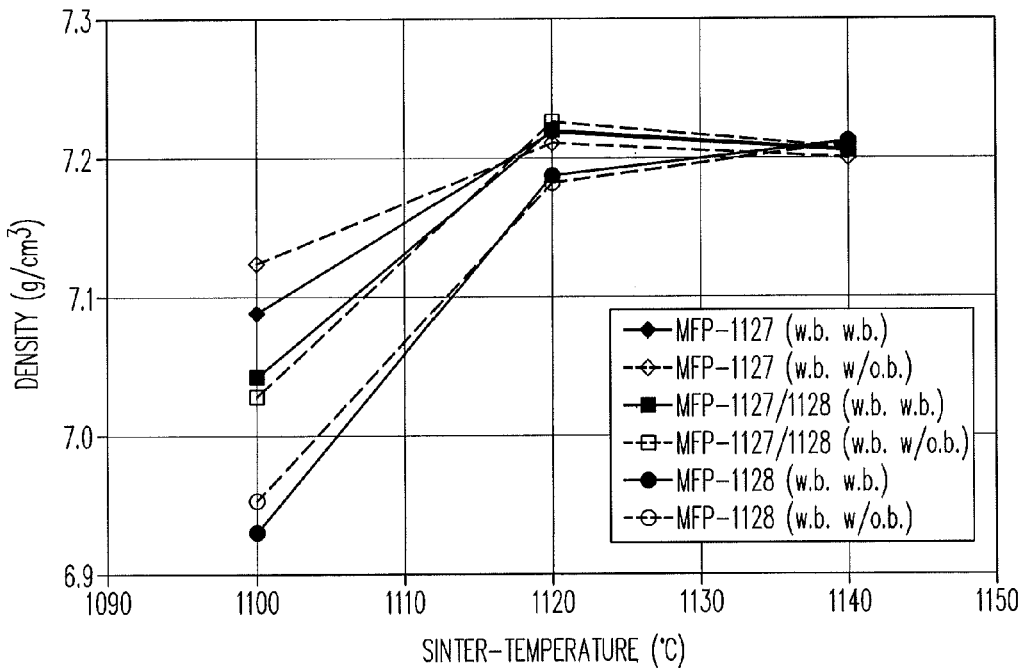
FIG. 5 illustrates a graph illustrating density as a function of sinter temperature for a fourth embodiment.

The density of all of the samples was measured and the α-Fe content for the samples sintered at 1120° C. was measured. The results are summarised in Table 5 and illustrated in the graph of FIG. 5.

TABLE 5

| sample | composition | steel balls | TS = 1100° C. density (g/cm³) | TS = 1120° C. density (g/cm³) | TS = 1120° C. α-Fe (%) | TS = 1140° C. density (g/cm³) |
|---|---|---|---|---|---|---|
| 1 | MFP-1127 | w.b. w.b. | 7.089 | 7.216 | 3.7 | 7.203 |
| 2 | Mix 1127/1128 | w.b. w.b. | 7.041 | 7.22 | 2.9 | 7.203 |
| 3 | MFP-1128 | w.b. w.b. | 6.93 | 7.185 | 2.4 | 7.21 |
| 4 | MFP-1127 | w.b. w/o.b. | 7.123 | 7.209 | 3.4 | 7.198 |
| 5 | Mix 1127/1128 | w.b. w/o.b. | 7.027 | 7.224 | 2.9 | 7.204 |
| 6 | MFP-1128 | w.b. w/o.b. | 6.952 | 7.18 | 2.5 | 7.208 |

Figure 6:
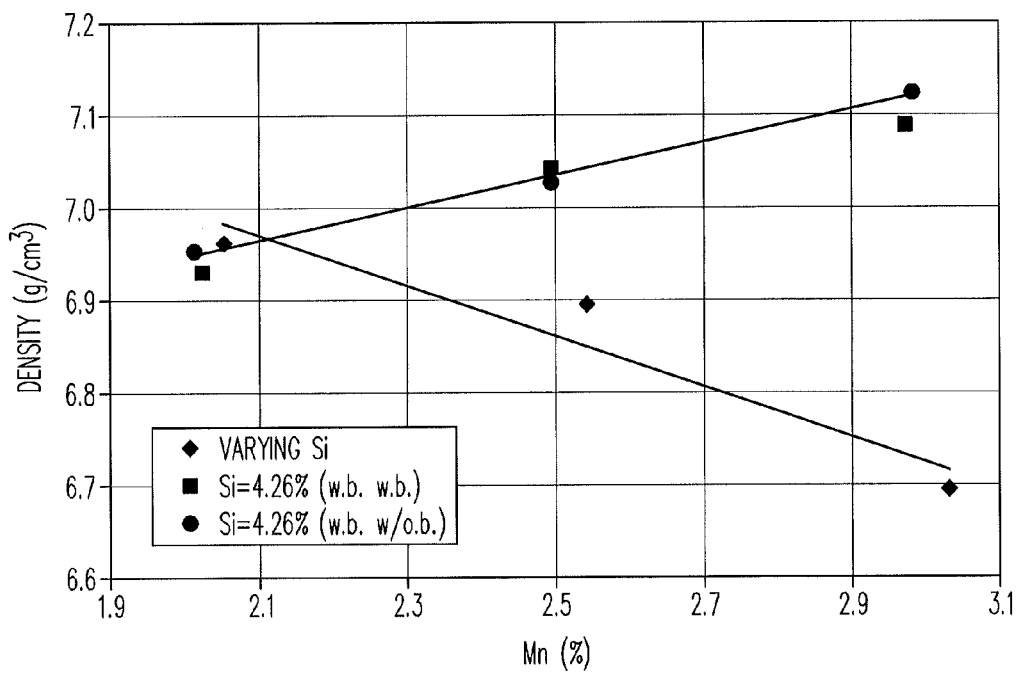
FIG. 6 illustrates a graph illustrating density as a function of manganese content with a constant silicon content and a varying silicon content.

FIG. 6 illustrates a graph comparing the density of samples as a function of manganese content for constant and varying silicon content. By comparing these results of the fourth embodiment, in which the silicon content was held constant, with those of the third embodiment in which the silicon content was increased with increasing manganese content, an improved relationship between the silicon content and the manganese content can be formulated as follows:

$$Si_m = 3.85 - 0.045 \times Mn_m^2 + 0.2965 \times Mn_m \quad (3)$$

This relationship is found to produce a more similar sinter density for samples having different manganese contents than the starting relationship.

The samples were hydrogenated using the method previously described and before the magnetocalorically measurements were performed, the samples were heated in flowing nitrogen at 150° C. for 10 minutes. The magnetocaloric properties of the hydrogenated powder are summarised in Table 6.

In the first heat treatment A, the samples were heated to 1100° C. for 3 hours in vacuum and 1 hour in argon, followed by cooling in 1 hour to 1050° C. followed by a dwell for 6 hours at 1050° C. and cooling to room temperature.

In the second heat treatment B, the green bodies were heated to 1080° C. for 4 hours in vacuum followed by cooling in ½ hour to 1000° C. followed by heating in 1 hour to 1080° C. where the samples were held for 3 hours in vacuum and one hour argon before cooling in 24 hours to temperature of 1050° C. The samples were held at 1050° C. for 24 hours before cooling to room temperature.

In the third heat treatment C, the samples were heated to 1090° C. and held at this temperature for 4 hours in a vacuum before cooling in ½ hour to 1000° C., heating in 1 hour to a temperature of 1090° C. which was held for 3 hours under vacuum followed by 1 hour in argon. The samples were then cooled in 6 hours to 1050° C. and this temperature held for 6 hours before cooling to room temperature.

TABLE 6

| sample | composition | steel balls | $-\Delta S_{m,max}$ J/(kg·K) | $-\Delta S_{m,max}$ kJ/(m³·K) | $T_{PEAK}$ (°C.) | $\Delta T_{FWHM}$ (°C.) | α-Fe (%) |
|---|---|---|---|---|---|---|---|
| VZ1002-MCE-1A1 | MFP-1127H | w.b. w.b. | 7.76 | 56.01 | −0.55 | 13.15 | 3.7 |
| VZ1002-MCE-1B1 | MFP-1127H | w.b. w.b. | 9.87 | 70.00 | −0.78 | 9.89 | n.a. |
| VZ1002-MCE-1C1 | MFP-1127H | w.b. w.b. | 6.94 | 50.00 | −3.72 | 13.44 | n.a. |
| VZ1002-MCE-2A1 | Mix 1127/1128 | w.b. w.b. | 6.33 | 45.68 | 12.00 | 17.63 | n.a. |
| VZ1002-MCE-3A1 | MFP-1128H | w.b. w.b. | 11.14 | 80.08 | 24.64 | 9.20 | n.a. |
| VZ1002-MCE-4A1 | MFP-1127H | w.b. w/o.b. | 7.36 | 53.05 | −1.11 | 13.80 | n.a. |
| VZ1002-MCE-5A1 | Mix 1127/1128 | w.b. w/o.b. | 8.81 | 63.65 | 10.10 | 12.02 | n.a. |
| VZ1002-MCE-6A1 | MFP-1128H | w.b. w/o.b. | 10.40 | 74.65 | 23.93 | 9.87 | n.a. |

These results show that mixing the powder with steel balls (denoted w.b. in Table 6) rather than without steel balls (denoted w/o.b in Table 6) results in an increase in the entropy change ($\Delta S_{m,max}$) so that an entropy change of at least 8 J/kgK is achieved even for the higher manganese contents.

These results also suggest that the following modified relationship between the peak temperature at which the greatest entropy change is observed (denoted $T_{peak}$ in Table 6), which corresponds to the Curie temperature $T_c$, and manganese content $Mn_m$ is more accurate:

$$T_c = 80.672 - 26.957 \times Mn_m \quad (4)$$

In a third set of embodiments the two revised equations 3 and 4 were used to fabricate two samples having the following composition and expected Curie temperature summarised in Table 7 The two metallic compositions are: 16.7 wt % La, 4.33 wt % Si, 2.86 wt % Mn, rest Fe, and 16.7 wt % La, 4.26 wt % Si, 2.02 wt % Mn, rest Fe. The expected $T_c$ for a fully hydrogenated composition is 3.5° C. and 26.3° C. respectively.

TABLE 7

| | $La_m$ (wt. %) | $Si_m$ (wt. %) | $Mn_m$ (wt. %) | $T_{c,hyd}$ (°C.) |
|---|---|---|---|---|
| MFR-1129 | 16.7 | 4.33 | 2.86 | 3.5 |
| MFP-1130 | 16.7 | 4.26 | 2.02 | 26.3 |

These powders were mixed with steel balls and 60 g of each powder was isostatically pressed to form green bodies. A green body of each composition was heated using three different heat treatments.

The results of the density and α-Fe content measured for these three samples is summarised in Table 8.

TABLE 8

| | | TS = 1080° C. | | TS = 1090° C. | | TS = 1100° C. | |
|---|---|---|---|---|---|---|---|
| composition | steel balls | density (g/cm³) | α-Fe (%) | density (g/cm³) | α-Fe (%) | density (g/cm³) | α-Fe (%) |
| MFP-1129 | w/o.b. | 6.999 | 2.4 | 7.016 | 1.7 | 7.032 | 1.5 |
| Mix 1129/1130 | w/o.b. | 7.06 | 2.0 | 7.000 | 1.1 | 6.958 | 1.6 |
| Mix 1129/1130 | w.b. | 7.058 | 1.8 | 7.024 | 1.6 | 7.018 | 1.5 |
| MFP-1130 | w/o.b. | 7.011 | 1.6 | 6.982 | 1.3 | 6.938 | 1.4 |

As can be seen, the α-Fe content is less than 2 volume percent for nearly all of the samples. Furthermore, the density of the three samples at a given sinter temperature varies less than in the previous embodiments.

The samples were hydrogenated as previously described and the magnetocaloric properties measured. Before measuring the magnetocaloric properties, the samples were heated at 150° C. for 10 minutes. The results are summarised in Table 9. As can be seen from Table 9, the entropy change, $-\Delta S_{m,max}$, has increased over the previous two embodiments and in some cases is nearly 12 J/kgK.

TABLE 9

| sample | composition | Kugeln | $-\Delta S_{m,max}$ J/(kg·K) | $-\Delta S_{m,max}$ kJ/(m³·K) | $T_{PEAK}$ (°C.) | $\Delta T_{FWHM}$ (°C.) | α-Fe (%) |
|---|---|---|---|---|---|---|---|
| Ka374-1A2 | MFP-1129H | w/o.b. | 8.30 | 58.37 | 3.06 | 12.05 | 1.5 |
| Ka374-2A2 | Mix 1129/1130 | w/o.b. | 9.18 | 63.87 | 8.77 | 13.95 | 1.6 |
| Ka374-3A2 | Mix 1129/1130 | w.b. | 10.93 | 76.71 | 14.22 | 9.82 | 1.5 |
| Ka374-4A3 | MFP-1130H | w/o.b. | 11.99 | 83.19 | 24.32 | 9.56 | 1.4 |
| Ka374-1B2 | MFP-1129H | w/o.b. | 8.60 | 60.19 | 2.15 | 13.96 | 2.4 |
| Ka374-2B2 | Mix 1129/1130 | w/o.b. | 8.93 | 63.05 | 7.77 | 14.05 | 2.0 |
| Ka374-3B2 | Mix 1129/1130 | w.b. | 11.87 | 83.78 | 12.52 | 9.03 | 1.8 |
| Ka374-4B2 | MFP-1130H | w/o.b. | 10.00 | 70.11 | 21.13 | 10.56 | 1.6 |
| Ka374-1C2 | MFP-1129H | w/o.b. | 9.79 | 68.69 | 0.86 | 11.20 | 1.7 |
| Ka374-2C2 | Mix 1129/1130 | w/o.b. | 9.90 | 69.30 | 13.43 | 11.62 | 1.1 |
| Ka374-3C2 | Mix 1129/1130 | w.b. | 9.49 | 66.66 | 14.78 | 10.96 | 1.6 |
| Ka374-4C2 | MFP-1130H | w/o.b. | 11.94 | 83.37 | 24.32 | 9.32 | 1.3 |

Therefore, the Curie temperature $T_c$ of a fully or substantially fully hydrogenated $La_{1-a}R_a(Fe_{1-x-y}T_ySi_x)_{13}H_z$ based samples can be selected by substituting the appropriate mount of manganese according to equation 4:

$$T_c = 80.672 - 26.957 \times Mn_m \quad (4)$$

Furthermore, by adjusting the silicon content of the powder as a function of the manganese content according to the following relationship of equation 3:

$$Si_m = 3.85 - 0.045 \times Mn_m^2 + 0.2965 \times Mn_m \quad (3)$$

the sinter density of samples having differing manganese content and, therefore, differing $T_c$ can be made substantially constant.

This nearly constant sinter density can be used to fabricate a plurality of separate working components having differing manganese contents and therefore, differing Tc at a single sinter temperature. Therefore, the plurality of separate working components desired for a particular article for a particular heat magnetic heat exchanger can be fabricated in a single furnace run.

In further embodiments, these relationships can be used to fabricate a monolithic working component which includes integral portions having different manganese content and, therefore, different $T_c$, but similar sinter densities. The similar sinter densities enables the different compositions to be fabricated within a single monolithic working component.

If the sinter activities and the resulting densities were not similar, then portions of the monolithic working component which had a lower sinter activity would not sufficiently sinter at a given temperature and would be weaker than those of other portions which had an increased sinter activity at this temperature which results in an increased density. Therefore, a monolithic working component having integral portions of differing composition would have regions that are mechanically unstable due to a low sinter activity and low density in these portions or would even crack in these mechanically unstable regions so that a monolithic working component would not be formed at all.

This problem can be avoided by adjusting the silicon content of the $La_{1-a}R_a(Fe_{1-x-y}T_ySi_x)_{13}H_z$ phase as a function of the substituting element R and T and the amount of the substituting element R and T.

The invention having been described herein with respect to certain of its specific embodiments and examples, it will be understood that these do not limit the scope of the appended claims.

The invention claimed is:

1. A method of fabricating a working component for magnetic heat exchange, comprising:

selecting for each of two or more portions of the working component amounts of La, Fe, Si, and one or more elements T and R suitable to produce a $La_{1-a}R_a(Fe_{1-x-y}T_ySi_x)_{13}H_z$ phase, wherein T is one or more of the elements from the group consisting of Mn, Co, Ni and Cr and R is one or more of the elements from the group consisting of Ce, Nd, Y and Pr, wherein the amount of the one or more elements T and R and the amount of Si that are selected for each of the two or more portions provides each of the two or more portions with a different Curie temperature, but with a similar sinter activity, wherein the two or more sintered portions of the working component comprise differing silicon contents after being sintered, mixing the amount of the selected elements T, R and Si with La, Fe or precursors thereof in amounts suitable for producing the $La_{1-a}R_a(Fe_{1-x-y}T_ySi_x)_{13}H_z$ phase to produce two or more precursor powder mixtures, wherein a and y are such that $0 \leq a \leq 0.5$, $0.003 \leq y \leq 0.2$, or $0.05 \leq a \leq 0.5$, $0 \leq y \leq 0.2$, or $0.05 \leq a \leq 0.5$, $0.003 \leq y \leq 0.2$, x is such that $0.05 \leq x \leq 0.2$, and z is the hydrogen content, which ranges between 0 and $z_{sat}$, wherein $z_{sat}$ is the saturation hydrogen concentration, producing a single monolithic green body from the two or more precursor powder mixtures, wherein the single monolithic green body is heat treated at a temperature $T_{sinter}$ to produce a single monolithic working component comprising the two or more sintered portions each having a differing $T_c$ and a density, d, within a range of ±5% of an average density, $d_{av}$, of a total number of the sintered portions.

2. The method according to claim 1, further comprising hydrogenating the sintered portions comprises heat treating under a $H_2$ partial pressure of 0.5 to 2 bar.

3. The method according to claim 2, wherein the hydrogenating comprises:

heating the working component from a temperature of less than 50° C. to at least 300° C. in an inert atmosphere, introducing hydrogen gas only when a temperature of at least 300° C. is reached, maintaining the working component in a hydrogen containing atmosphere at a temperature in the range 300° C. to 700° C. for a selected duration of time, and cooling the working component to a temperature of less than 50° C. to provide a second working component.

4. The method of claim 3, wherein the working component is cooled to a temperature of less than 50° C. in a hydrogen-containing atmosphere.

5. The method according to claim 3, wherein hydrogen gas is introduced only when a temperature of 400° C. to 600° C. is reached.

6. The method according to claim 3, wherein after hydrogenating, the second working component comprises at least 0.18 wt % hydrogen.

7. The method according to claim 2, wherein the hydrogenating comprises heat treating at a temperature in the range 0° C. to 100° C.

8. The method according to claim 7, wherein the hydrogenating comprises heat treating at a temperature in the range 15° C. to 35° C.

9. The method according to claim 2, wherein the hydrogenating comprises a dwell at a temperature $T_{hyd}$, wherein 300° C.$\leq T_{hyd} \leq$700° C.

10. The method according to claim 9, wherein the hydrogenating comprises a dwell at a temperature $T_{hyd}$, wherein 300° C.$\leq T_{hyd} \leq$700° C. followed by cooling to a temperature of less than 100° C.

11. The method according to claim 2, wherein the $H_2$ partial pressure is increased during hydrogenating.

12. The method according to claim 1, wherein T comprises Mn and can optionally further comprise Co, and wherein the amount of silicon is selected according to $Si_m$=3.85−0.0573×$Co_m$−0.045×$Mn_m^2$+0.2965×$Mn_m$,
wherein $Si_m$ is the metallic weight fraction of silicon, $Mn_m$ is the metallic weight fraction of manganese, $Co_m$ is the metallic weight fraction of any cobalt that is present.

13. The method according to claim 12, wherein the sintered portions comprise a silicon content Si, $Si_{act}$, that lies within ±5% of $Si_m$.

14. The method according to claim 13, wherein $Si_{act}$ that lies within ±2% of $Si_m$.

15. The method according to claim 1, wherein a multistep heat treating process is used to heat treat the green body.

16. The method according to claim 15, wherein the multi-step heat treatment comprises a first dwell at $T_{sinter}$ for a time $t_1$ in vacuum and a time $t_2$ in argon, followed by cooling to a temperature $T_1$, wherein $T_1 < T_{sinter}$, followed by a second dwell at $T_1$ for a time $t_3$ followed by rapid cooling.

17. The method according to claim 16, wherein 1000° C.$\leq T1 \leq$1080° C. and/or 0.5 h$\leq t_1 \leq$10 h and/or 0.5 h$\leq t_2 \leq$10 h and/or 1 h$\leq t_3 \leq$20 h and/or the rapid cooling takes place at a rate of 5 to 200° C./min.

18. The method according to claim 1, wherein the two or more sintered portions of the working component comprise differing values of a and y.

19. The method according to claim 1, wherein the amount of one or more of the elements R and T is selected within the ranges 0$\leq$a$\leq$0.5 and 0.003$\leq$y$\leq$0.2.

20. The method according to claim 1, wherein the amount of one or more of the elements R and T is selected within the ranges 0.05$\leq$a$\leq$0.5 and 0$\leq$y$\leq$0.2.

21. The method according to claim 1, wherein the amount of one or more of the elements R and T is selected within the ranges 0.05$\leq$a$\leq$0.5 and 0.003$\leq$y$\leq$0.2.

22. The method according to claim 1, wherein 1050° C.$\leq T_{sinter} \leq$1200° C.

23. The method according to claim 1, wherein the mixing is carried out using steel balls and optionally isopropanol.

24. The method according to claim 1, wherein producing the green body comprises pressing the precursor powder mixtures to form the green body.

25. The method according to claim 1, wherein density, d, is within a range of ±2% of the average density, $d_{av}$, of the total number of the sintered portions.

* * * * *